US 9,920,398 B2

(12) United States Patent
Iosaki et al.

(10) Patent No.: US 9,920,398 B2
(45) Date of Patent: Mar. 20, 2018

(54) ZINC PRODUCTION METHOD (71) Applicant: Kinotech Solar Energy Corporation, Tokyo (JP)

(72) Inventors: Masaaki Iosaki, Chiba (JP); Shuji Mori, Kanagawa (JP)

(73) Assignee: Kinotech Solar Energy Corporation, Tokyo (JP)

( * ) Notice: Subject to any disclaimer, the term of this patent is extended or adjusted under 35 U.S.C. 154(b) by 51 days.

(21) Appl. No.: 14/889,206

(22) PCT Filed: May 8, 2014

(86) PCT No.: PCT/JP2014/062373
§ 371 (c)(1),
(2) Date: Jan. 11, 2016

(87) PCT Pub. No.: WO2014/181833
PCT Pub. Date: Nov. 13, 2014

(65) Prior Publication Data
US 2016/0138130 A1 May 19, 2016

(30) Foreign Application Priority Data
May 8, 2013 (JP) .................................. 2013-098317

(51) Int. Cl.
*C22B 19/02* (2006.01)
*C22B 3/00* (2006.01)
(Continued)

(52) U.S. Cl.
CPC .............. *C22B 19/26* (2013.01); *C22B 7/007* (2013.01); *C22B 7/02* (2013.01); *C22B 19/02* (2013.01);
(Continued)

(58) Field of Classification Search
CPC ......... C22B 19/26; C22B 19/28; C22B 19/02; C22B 19/22; C22B 19/30; C22B 19/32;
(Continued)

(56) References Cited

U.S. PATENT DOCUMENTS 4,572,771 A * 2/1986 Duyvesteyn ........... C01G 9/003
205/606
5,683,488 A 11/1997 Myerson et al.
(Continued)

FOREIGN PATENT DOCUMENTS

| CN | 1561401 A | 1/2005 |
| EP | 1434892 | 7/2004 |

(Continued)

OTHER PUBLICATIONS

Official Action dated Nov. 28, 2016 in counterpart Chinese application No. 2016112301503770.
Abbott, A.P. et al.,"Processing metal oxides using ionic liquids", Transactions of the Institutions of Mining and Metallurgy: Section C, 2006, 115(1), pp. 15-18.
(Continued)

*Primary Examiner* — Arun S Phasge
(74) *Attorney, Agent, or Firm* — Duane Morris LLP (57) ABSTRACT

A zinc production method includes a reaction step such as a leaching step (101) of bringing electric arc furnace dust (1) containing zinc oxide or the like into contact with a chlorine gas (8) to obtain a zinc oxide component in the electric arc furnace dust (1) or the like as crude zinc chloride (3), a purification step (102) of heating the crude zinc chloride (3) obtained at the reaction step to produce zinc chloride vapor, and cooling and condensing the zinc chloride vapor, thereby obtaining purified zinc chloride (6), and an electrolysis step (103) of electrolyzing the purified zinc chloride (6) obtained at the purification step (102) in a molten state to obtain a zinc melt (9) and the chlorine gas (8).

14 Claims, 4 Drawing Sheets (51) Int. Cl.
*C25C 3/34* (2006.01)
*C22B 7/02* (2006.01)
*C22B 19/30* (2006.01)
*C25C 7/00* (2006.01)
*C22B 7/00* (2006.01)
*C22B 19/28* (2006.01)
*C22B 19/32* (2006.01)
*C25B 1/26* (2006.01)

(52) U.S. Cl.
CPC .............. *C22B 19/22* (2013.01); *C22B 19/28* (2013.01); *C22B 19/30* (2013.01); *C22B 19/32* (2013.01); *C25B 1/26* (2013.01); *C25C 3/34* (2013.01); *C25C 7/00* (2013.01); *Y02P 10/212* (2015.11)

(58) Field of Classification Search
CPC .. C22B 7/007; C22B 7/02; C25B 1/26; C25C 7/00; C25C 3/34; Y02P 10/212
See application file for complete search history.

(56) References Cited

U.S. PATENT DOCUMENTS 6,338,748 B1 1/2002 Lee et al.
2005/0006247 A1* 1/2005 Vandenhaute ........... C01G 9/04
205/606

FOREIGN PATENT DOCUMENTS

| | | |
|---|---|---|
| JP | 2000290736 A | 10/2000 |
| JP | 2002105550 A | 4/2002 |
| JP | 200974132 A | 4/2009 |
| WO | 9623905 A1 | 8/1995 |
| WO | 03031666 A1 | 4/2003 |

OTHER PUBLICATIONS

European Search Report dated Jan. 31, 2017 in counterpart EP patent application No. 14794146.2.

* cited by examiner

ZINC PRODUCTION METHOD

TECHNICAL FIELD

The present invention relates to a zinc production method, and more particularly relates to a zinc production method of using, as a raw material, electric arc furnace dust generated at the time of dissolution smelting of scraps, or secondary dust generated in a reduction furnace at the time of recycling a part of the electric arc furnace dust as an iron-making raw material or a cement extender, in an electric arc furnace method being one of iron-making process.

BACKGROUND ART

In an electric arc furnace method being one of iron-making process, electric arc furnace dust is generated as industrial waste containing a zinc oxide component of about 1.5% to 2.0% of an amount of steelmaking, at the time of dissolution smelting of scrap. It has been said that twenty million tons of electric arc furnace dust is generated in the world and 500,000 tons of electric arc furnace dust is generated in Japan. A part of the electric arc furnace dust is further reduced in a reduction furnace and recycled as an iron-making raw material or a cement extender. Exhaust gas generated from the reduction furnace contains secondary dust (crude zinc oxide) in which zinc oxide is condensed.

Most of iron scrap is generated from discarded electric appliance or discarded vehicles. A surface for painting of the discarded electric appliance or discarded vehicle has been galvanized. The scrap contains paint, plastic, oil, and the like. Therefore, the electric arc furnace dust also contains harmful organic matter such as chlorides and dioxins, in addition to heavy metals such as zinc and lead. Meanwhile, the electric arc furnace dust contains about 20% to 30% iron and 20% to 30% zinc. Therefore, the electric arc furnace dust is very useful as resources.

Currently, crude zinc oxide produced from the electric arc furnace dust by various recycling techniques becomes a raw material for dry or wet zinc smelting. Main recycling technique is Wells furnace method, and other than this, a plasma method, an electric melting reduction method, an MF furnace method, a rotating bed furnace method, and the like can be mentioned.

Under such circumstances, Patent Document 1 relates to a zinc recovery method, and discloses a metal zinc recovery method from electric arc furnace dust containing zinc oxide generated from an iron scrap refining furnace or the like of the electric arc furnace method. Specifically, Patent Document 1 discloses mixing and kneading electric arc furnace dust or secondary dust with metal iron-containing powder, a reducing agent, a binding agent, and water, and thereafter, molding and further firing the mixture in a reduction furnace. With this configuration, in Patent Document 1, zinc oxide in the electric arc furnace dust or in the secondary dust is recovered as metal zinc vapor.

PRIOR ART DOCUMENT

Patent Document

Patent Document 1: Japanese Patent Laid-Open Publication No. 2002-105550

SUMMARY OF THE INVENTION

Problem to be Solved by the Invention

According to studies made by the present inventors, in the configuration disclosed in Patent Document 1, zinc oxide in the electric arc furnace dust or in the secondary dust is recovered as metal zinc vapor. However, because a chlorine component is contained in crude zinc oxide, removal of the chlorine component at the time of producing zinc bare metal from the crude zinc oxide tends to be expensive.

Furthermore, in the configuration disclosed in Patent Document 1, the composition of the recovered metal zinc has a purity of 3N at most, and thus there is a room for improvement of purity.

Further, according to the studies made by the present inventors, in an electrolysis method in wet refining using crude zinc oxide as a raw material, electrolysis of an aqueous solution of dilute sulfuric acid is used. The current density thereof is as low as 500 A/m$^2$, and zinc bare metal that has grown on a cathode surface needs to be recovered by detaching the cathode. Therefore, a recovery work and facilities therefor are required. Accordingly, in the electrolysis method in the wet refining, a plant tends to be large in order to obtain a scale merit for reducing the cost, and thus there is a trend of building a large-scale plant. That is, it can be said that, in the current zinc production method using the electric arc furnace dust, electric arc furnace dust can be turned into an intermediate material being crude zinc oxide; however, crude zinc oxide needs to be delivered into a large-scale zinc smelter, by bearing the transportation cost.

The present inventors have conducted vigorous investigations and have found that the above problems can be solved by extracting a zinc component in the electric arc furnace dust or in the secondary dust to obtain anhydrous zinc chloride, and then distilling and purifying the anhydrous zinc chloride and treating the anhydrous zinc chloride according to a molten salt electrolysis method, thereby completing the present invention.

The present invention has been achieved in view of the above problems, and an object of the present invention is to provide a zinc production method that is suitable for treatment of electric arc furnace dust containing a large amount of chlorine without requiring any additional cost for dechlorination, can produce high-purity zinc bare metal having a purity of 4N or higher, and enables operations with a compact device.

Means for Solving the Problem

The present invention has a configuration such that crude zinc chloride being anhydrous metal chloride containing zinc chloride as a main component is produced from a compound containing, as a main component, zinc obtained by bringing a zinc oxide component in electric arc furnace dust or in secondary dust into contact with a chlorine gas, chlorinating agent containing chlorine such as calcium chloride, hydrochloric acid or an alkaline agent, and purified by distillation and then electrolyzed by a molten salt electrolysis method. With this configuration, the present invention has a basic concept of obtaining high-purity zinc bare metal having a purity of 4N or higher.

A molten salt electrolysis bath in the present invention uses chloride. Therefore, even if the material contains a chlorine component, additional cost for dechlorination, which has been required in the conventional method, is not required, which is advantageous for treatment of electric arc furnace dust or the like containing a large amount of chlorine.

Zinc chloride in the crude zinc chloride is gasified, condensed, and distilled, thereby purifying zinc chloride by separating (distilling) zinc chloride from other metal chloride components by using a vapor pressure difference therebetween. The metal zinc having a purity of 4N or higher is obtained by subjecting the purified zinc chloride obtained by the purification process to the molten salt electrolysis as an electrolysis bath.

Furthermore, in the molten salt electrolysis method of zinc chloride according to the present invention, productivity ten times that of the existing electrolysis of aqueous solution, that is, 5000 A/m$^2$ per 1 m$^2$ of a surface area of an electrode can be obtained as compared to the current density of about 500 A/m$^2$ in the existing electrolysis of aqueous solution. Accordingly, the facilities therefor can be made compact. Further, according to the molten salt electrolysis method of zinc chloride according to the present invention, if the temperature of the electrolysis bath is set to a melting point or higher of metal zinc, zinc bare metal obtained by electrolytic deposition can be extracted from the bottom of an electrolytic tank in a molten state. Therefore, detachment work of the cathode, which is required in the electrolysis of aqueous solution, is not required, thereby enabling labor-saving. Consequently, in a place where the electric arc furnace dust is generated, an on-site zinc smelter in which the electric arc furnace dust containing a halogen component is used as a raw material can be realized.

To achieve the above object, a first aspect of the present invention is to provide a zinc production method comprising: a reaction step of obtaining crude zinc chloride from a zinc oxide component in electric arc furnace dust containing zinc oxide or in secondary dust generated at a time of reducing the electric arc furnace dust in a reduction furnace; a purification step of heating the crude zinc chloride obtained at the reaction step to produce zinc chloride vapor, and cooling and condensing the zinc chloride vapor, thereby obtaining purified zinc chloride; and an electrolysis step of electrolyzing the purified zinc chloride obtained at the purification step in a molten state to obtain a zinc melt and a chlorine gas.

According to a second aspect of the present invention, in addition to the first aspect, the reaction step is a leaching step of bringing the electric arc furnace dust or the secondary dust into contact with a chlorine gas to extract a zinc oxide component in the electric arc furnace dust or in the secondary dust as crude zinc chloride.

According to a third aspect of the present invention, in addition to the second aspect, at the leaching step, the electric arc furnace dust or the secondary dust is brought into contact with the chlorine gas obtained by electrolysis at the electrolysis step.

In the second and third aspects of the present invention, the chlorine gas used as a chlorinating agent can be brought into contact with calcium carbonate, calciumhydroxide, calcium oxide, sodium carbonate, sodium hydroxide, sodium oxide, ammonia gas, or the like, to turn the chlorine gas into a chlorinating agent in the form of calcium chloride, calcium hypochlorite, ammonium chloride, or the like, and then the chlorinating agent can be brought into contact with the electric arc furnace dust or the like. Needless to mention, calcium chloride separately prepared or the like can be used as such a chlorinating agent.

Further, a mixture in which electric arc furnace dust or the like is premixed with calcium carbonate or the like is prepared and the mixture material can be brought into contact with a chlorine gas. An organic compound such as carbon or alcohol can be mixed in a raw material of such a mixture.

According to a fourth aspect of the present invention, in addition to the second or third aspect, the purification step includes a first purification step of bringing the crude zinc chloride extracted at the leaching step into contact with a chlorine gas in a molten state to oxidize a metal component other than zinc in the crude zinc chloride, thereby turning the metal component into metal chloride having a lower boiling point than that of zinc chloride, and then heating the crude zinc chloride to evaporate and separate the metal chloride therefrom, and a second purification step of heating the crude zinc chloride having undergone the first purification step to produce zinc chloride vapor, and cooling and condensing the zinc chloride vapor to obtain purified zinc chloride, and at the electrolysis step, the purified zinc chloride obtained at the second purification step is used.

In the fourth aspect, the metal chloride having the low boiling point obtained in the first purification step and/or the metal chloride component in a residue, from which purified zinc chloride is separated, obtained in the second purification step can be used as the chlorinating agent in the reaction step described above.

According to a fifth aspect of the present invention, in addition to the fourth aspect, at the first purification step, the crude zinc chloride in a molten state is brought into contact with the chlorine gas obtained by electrolysis at the electrolysis step.

According to a sixth aspect of the present invention, in addition to the first aspect, the reaction step is a leaching step of bringing the electric arc furnace dust or the secondary dust into contact with hydrochloric acid to extract a zinc oxide component in the electric arc furnace dust or in the secondary dust as crude zinc chloride, and further includes a drying step of bringing the crude zinc chloride extracted at the leaching step into contact with a chlorine gas, after heating the crude zinc chloride to separate water contained in the crude zinc chloride therefrom as water vapor, and at the purification step, the crude zinc chloride having undergone the drying step is heated.

According to a seventh aspect of the present invention, in addition to the sixth aspect, at the leaching step, the electric arc furnace dust or the secondary dust is brought into contact with the hydrochloric acid produced by using the chlorine gas obtained by electrolysis at the electrolysis step as a raw material.

According to an eighth aspect of the present invention, in addition to the seventh aspect, at the leaching step, water is used simultaneously at a time of bringing the electric arc furnace dust or the secondary dust into contact with the hydrochloric acid.

According to a ninth aspect of the present invention, in addition to the first aspect, the reaction step includes a leaching step of bringing the electric arc furnace dust or the secondary dust into contact with an aqueous solution of an alkaline agent to turn a zinc oxide component in the electric arc furnace dust or in the secondary dust into zinc hydroxide, thereby obtaining a leaching solution containing the zinc hydroxide, a crystallization step of precipitating and settling the zinc hydroxide from the leaching solution obtained at the leaching step, and separating and recovering the zinc hydroxide therefrom as a solid, and a chlorination step of bringing the zinc hydroxide separated and recovered at the crystallization step into contact with hydrochloric acid to obtain crude zinc chloride, and further includes a drying step of bringing the crude zinc chloride obtained at the chlorination step into contact with a chlorine gas, after heating the crude zinc chloride to separate water contained in the crude zinc chloride therefrom as water vapor, and at the purification step, the crude zinc chloride having undergone the drying step is heated.

According to a tenth aspect of the present invention, in addition to the ninth aspect, at the leaching step, an aqueous solution from which the zinc hydroxide has been separated and recovered at the crystallization step is used as the aqueous solution of an alkaline agent.

According to an eleventh aspect of the present invention, in addition to the ninth or tenth aspect, at the chlorination step, the zinc hydroxide separated and recovered at the crystallization step is brought into contact with hydrochloric acid produced by using the chlorine gas obtained by the electrolysis at the electrolysis step as a raw material.

According to a twelfth aspect of the present invention, in addition to any one of the ninth to eleventh aspects, an alkaline agent in the aqueous solution of an alkaline agent is sodium hydroxide or potassium hydroxide.

According to a thirteenth aspect of the present invention, in addition to any one of the sixth to twelfth aspects, at the drying step, the crude zinc chloride from which water has been separated as water vapor is brought into contact with the chlorine gas obtained by the electrolysis at the electrolysis step.

According to a fourteenth aspect of the present invention, in addition to any one of the sixth to thirteenth aspects, the purification step include a first purification step of bringing the crude zinc chloride having undergone the drying step into contact with a chlorine gas in a molten state to oxidize a metal component other than zinc in the crude zinc chloride, thereby turning the metal component into metal chloride having a lower boiling point than that of zinc chloride, and then heating the crude zinc chloride to evaporate and separate the metal chloride therefrom, and a second purification step of heating the crude zinc chloride having undergone the first purification step to produce zinc chloride vapor, and cooling and condensing the zinc chloride vapor to obtain purified zinc chloride, and at the electrolysis step, the purified zinc chloride obtained at the second purification step is used.

According to a fifteenth aspect of the present invention, in addition to anyone of the sixth to eighth aspects or the fourteenth aspect, at the first purification step, the crude zinc chloride having undergone the drying step is brought into contact with the chlorine gas obtained by the electrolysis at the electrolysis step.

According to a sixteenth aspect of the present invention, in addition to any one of the third to fifth aspects and the fourteenth or fifteenth aspect, at the first purification step, the crude zinc chloride is maintained in a temperature range from 50□C to 450□C inclusive, in a state in which a pressure of a gas phase adjacent thereto is maintained within a range of a gauge pressure of 200 pascals or lower.

According to a seventeenth aspect of the present invention, in addition to any one of the first to sixteenth aspects, the crude zinc chloride is produced by heating and melting the crude zinc chloride, and by maintaining a pressure of a gas phase adjacent to a melt phase at 200 pascals or lower in a state in which a temperature of the melt phase is maintained within a range from 250□C to 750□C inclusive.

Effect of the Invention

According to the zinc production method of the first aspect of the present invention, the zinc production method includes the reaction step of obtaining the crude zinc chloride from the zinc oxide component in the electric arc furnace dust containing zinc oxide or in the secondary dust generated at the time of reducing the electric arc furnace dust in the reduction furnace, the purification step of heating the crude zinc chloride obtained at the reaction step to produce the zinc chloride vapor, and cooling and condensing the zinc chloride vapor, thereby obtaining the purified zinc chloride, and the electrolysis step of electrolyzing the purified zinc chloride obtained at the purification step in a molten state to obtain the zinc melt and the chlorine gas. Accordingly, a zinc production method that is suitable for treatment of the electric arc furnace dust or the like containing a large amount of chlorine without requiring any additional cost for dechlorination, can produce zinc bare metal having a high purity of 4N or higher, and enables operations with a compact device can be realized. Particularly, in the purification step, even if an alkaline metal component, an alkaline-earth metal component, and the like coexist in the crude zinc chloride, these components and the zinc chloride component can be separated from each other by using a vapor pressure difference therebetween.

According to the zinc production method of the second aspect of the present invention, the reaction step is a leaching step of bringing the electric arc furnace dust or the secondary dust into contact with the chlorine gas to extract the zinc oxide component in the electric arc furnace dust or in the secondary dust as the crude zinc chloride. Consequently, a zinc production method that is more suitable for treatment of the electric arc furnace dust or the like containing a large amount of chlorine without requiring any additional cost for dechlorination, can produce zinc bare metal having a high purity of 4N or higher more reliably, and enables operations with a more compact device can be realized.

According to the zinc production method of the third aspect of the present invention, at the leaching step, the electric arc furnace dust or the secondary dust is brought into contact with the chlorine gas obtained by the electrolysis at the electrolysis step, thereby enabling to realize a zinc production method that can decrease generation of waste.

In the zinc production method according to the second and third aspects, when the chlorine gas used as a chlorinating agent is to be brought into contact with calcium carbonate or the like to turn the chlorine gas into a chlorinating agent in the form of calcium chloride, which is then brought into contact with the electric arc furnace dust or the like, the chlorine gas can be used in a form that is easily handled with possibility of leakage or the like being decreased. Further, the residence time of the chlorinating agent in a chlorination reaction device can be extended. Identical effects can be obtained when calcium chloride or the like prepared separately is used as the chlorinating agent.

Furthermore, when a mixture in which the electric arc furnace dust or the like is premixed with calcium carbonate or the like is prepared and the mixture material is brought into contact with the chlorine gas, the possibility of leakage or the like of the chlorine gas can be decreased. Further, when an organic compound such as carbon or alcohol is to be mixed in the mixture material, safety can be increased by reducing chlorine to chloride, and heat for maintaining the temperature in a device where a chlorination reaction is carried out within a predetermined range can be supplemented.

According to the zinc production method of the fourth aspect of the present invention, the purification step includes the first purification step of bringing the crude zinc chloride extracted at the leaching step into contact with the chlorine gas in a molten state to oxidize metal components other than zinc in the crude zinc chloride, thereby turning the metal components into metal chloride having a lower boiling point than that of zinc chloride, and then heating the crude zinc chloride to evaporate and separate the metal chloride therefrom, and the second purification step of heating the crude zinc chloride having undergone the first purification step to produce zinc chloride vapor, and cooling and condensing the zinc chloride vapor to obtain the purified zinc chloride. At the electrolysis step, the purified zinc chloride obtained at the second purification step is used. Consequently, a zinc production method that is more suitable for treatment of the electric arc furnace dust or the like containing a large amount of chlorine without requiring any additional cost for dechlorination, can remove impurities contained in the crude zinc chloride more reliably and produce zinc bare metal having a high purity of 4N or higher more reliably, and enables operations with a more compact device can be realized. Particularly, in the second purification step, even if an alkaline metal component or an alkaline-earth metal component coexists in the crude zinc chloride, these components and the zinc chloride component can be separated from each other by using a vapor pressure difference therebetween.

In the zinc production method according to the fourth aspect, when the metal chloride having a low boiling point obtained at the first purification step and/or the metal chloride component in the residue, from which the purified zinc chloride is separated, obtained at the second purification step is used as the chlorinating agent in the reaction step described above, a zinc production method that can decrease generation of waste can be realized.

According to the zinc production method of the fifth aspect of the present invention, at the first purification step, the crude zinc chloride in a molten state is brought into contact with the chlorine gas obtained by the electrolysis at the electrolysis step, thereby enabling to realize a zinc production method that can decrease generation of waste.

According to the zinc production method of the sixth aspect of the present invention, the reaction step is a leaching step of bringing the electric arc furnace dust or the secondary dust into contact with hydrochloric acid to extract the zinc oxide component in the electric arc furnace dust or in the secondary dust as crude zinc chloride, and further includes the drying step of bringing the crude zinc chloride extracted at the leaching step into contact with the chlorine gas, after the crude zinc chloride is heated to separate water contained in the crude zinc chloride as water vapor. At the purification step, the crude zinc chloride having undergone the drying step is heated, thereby enabling to realize a zinc production method that is suitable for treatment of the electric arc furnace dust or the like containing a large amount of chlorine without requiring any additional cost for dechlorination, can produce zinc bare metal having a high purity of 4N or higher more reliably, and enables operations with a more compact device.

According to the zinc production method of the seventh aspect of the present invention, at the leaching step, the electric arc furnace dust or the secondary dust is brought into contact with the hydrochloric acid produced by using the chlorine gas obtained by the electrolysis at the electrolysis step as a raw material, thereby enabling to realize a zinc production method that can decrease generation of waste.

According to the zinc production method of the eighth aspect of the present invention, at the leaching step, water is used simultaneously at the time of bringing the electric arc furnace dust or the secondary dust into contact with the hydrochloric acid, thereby enabling to realize a zinc production method that can handle a low-quality material containing a large amount of impurities.

According to the zinc production method of the ninth aspect of the present invention, the reaction step includes the leaching step of bringing the electric arc furnace dust or the secondary dust into contact with the aqueous solution of an alkaline agent to turn the zinc oxide component in the electric arc furnace dust or in the secondary dust into zinc hydroxide, thereby obtaining the leaching solution containing the zinc hydroxide, the crystallization step of precipitating and settling the zinc hydroxide from the leaching solution obtained at the leaching step, and separating and recovering the zinc hydroxide therefrom as a solid, and the chlorination step of bringing the zinc hydroxide separated and recovered at the crystallization step into contact with hydrochloric acid to obtain the crude zinc chloride. The reaction step further includes the drying step of bringing the crude zinc chloride obtained at the crystallization step into contact with the chlorine gas, after the crude zinc chloride is heated to separate water contained in the crude zinc chloride as water vapor. At the purification step, the crude zinc chloride having undergone the drying step is heated, thereby enabling to realize a zinc production method that is more suitable for treatment of the electric arc furnace dust or the like containing a large amount of chlorine without requiring any additional cost for dechlorination, can produce zinc bare metal having a high purity of 4N or higher more reliably, and enables operations with a more compact device.

According to the zinc production method of the tenth aspect of the present invention, at the leaching step, the aqueous solution from which the zinc hydroxide has been separated and recovered at the crystallization step is used as the aqueous solution of an alkaline agent, thereby enabling to realize a zinc production method that can decrease generation of waste.

According to the zinc production method of the eleventh aspect of the present invention, at the chlorination step, the zinc hydroxide separated and recovered at the crystallization step is brought into contact with the hydrochloric acid produced by using the chlorine gas obtained by the electrolysis at the electrolysis step as a raw material, thereby enabling to realize a zinc production method that can decrease generation of waste.

According to the zinc production method of the twelfth aspect of the present invention, the alkaline agent in the aqueous solution of an alkaline agent is sodium hydroxide or potassium hydroxide, thereby enabling to realize a zinc production method that can dissolve selectively the zinc oxide component without dissolving an iron component in the aqueous solution.

According to the zinc production method of the thirteenth aspect of the present invention, at the drying step, the crude zinc chloride after water is separated therefrom as water vapor is brought into contact with the chlorine gas obtained by the electrolysis at the electrolysis step, thereby enabling to realize a zinc production method that can decrease generation of waste.

According to the zinc production method of the fourteenth aspect of the present invention, the purification step include the first purification step of bringing the crude zinc chloride having undergone the drying step into contact with the chlorine gas in a molten state to oxidize metal components other than zinc in the crude zinc chloride, thereby turning the metal components into metal chloride having a lower boiling point than that of zinc chloride, and then heating the crude zinc chloride to evaporate and separate the metal chloride therefrom, and the second purification step of heating the crude zinc chloride having undergone the first purification step to produce zinc chloride vapor, and cooling and condensing the zinc chloride vapor to obtain the purified zinc chloride. At the electrolysis step, the purified zinc chloride obtained at the second purification step is used, thereby enabling to realize a zinc production method that is more suitable for treatment of the electric arc furnace dust or the like containing a large amount of chlorine without requiring any additional cost for dechlorination, can remove impurities contained in the crude zinc chloride more reliably and produce zinc bare metal having a high purity of 4N or higher more reliably, and enables operations with a more compact device. Particularly, at the second purification step, if an alkaline metal component or an alkaline-earth metal component and the like coexist in the crude zinc chloride, these components and the zinc chloride component can be separated from each other by using a vapor pressure difference therebetween.

According to the zinc production method of the fifteenth aspect of the present invention, at the first purification step, the crude zinc chloride having undergone the drying step is brought into contact with the chlorine gas obtained by the electrolysis at the electrolysis step, thereby enabling to realize a zinc production method that can decrease generation of waste.

According to the zinc production method of the sixteenth aspect of the present invention, at the first purification step, the crude zinc chloride is maintained in the temperature range from 50□C to 450□C inclusive, in a state in which the pressure of the gas phase adjacent thereto is maintained within a range of gauge pressure of 200 pascals or lower. Consequently, low-boiling point components corresponding to the vapor partial pressure at the temperature can be evaporated, thereby enabling to remove impurities contained in the crude zinc chloride.

According to the zinc production method of the seventeenth aspect of the present invention, the zinc chloride vapor is produced by heating and melting the crude zinc chloride and maintaining the pressure of the gas phase adjacent to the melt phase thereof at 200 pascals or lower, in a state in which the temperature of the melt phase is maintained in the range from 250□C to 750□C inclusive. Consequently, the zinc chloride vapor corresponding to the vapor partial pressure at the temperature can be produced and condensed, thereby enabling to obtain high-purity zinc chloride.

EMBODIMENT FOR CARRYING OUT THE INVENTION

Embodiments of a zinc production method according to the present invention will be explained below in detail with reference to the accompanying drawings.

First Embodiment

A zinc production method according to a first embodiment of the present invention is described in detail with reference to FIG. 1.

Figure 1:
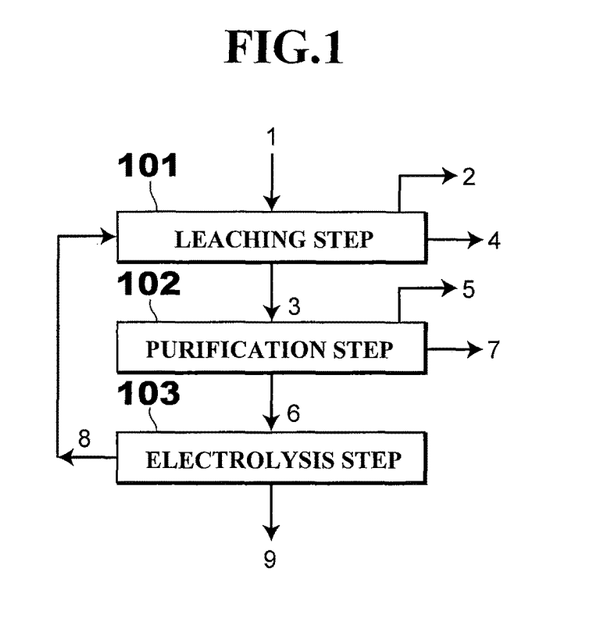
FIG. 1 is a process chart of a zinc production method according to a first embodiment of the present invention.

FIG. 1 shows steps of the zinc production method according to the first embodiment of the present invention.

As shown in FIG. 1, at a leaching step 101, a chlorine gas 8 is brought into contact with electric arc furnace dust 1 or secondary dust 1 generated in a reduction furnace at the time of recycling the electric arc furnace dust 1 or a part thereof as an iron-making raw material, in a tubular furnace (not shown), thereby extracting a zinc oxide component in the electric arc furnace dust 1 or in the secondary dust 1 as crude zinc chloride 3. The leaching step 101 is a reaction step to obtain the crude zinc chloride 3 from the zinc oxide component in the electric arc furnace dust 1 or in the secondary dust 1. The composition of the secondary dust 1 is shown in Table 1, and the composition of the crude zinc chloride 3 obtained from the secondary dust 1 is shown in Table 2.

TABLE 1

| Zn (%) | Pb (%) | Fe (%) | Cu (%) | Cd (%) | Sn (%) | Si (%) | undissolved |
|---|---|---|---|---|---|---|---|
| 62.90 | 3.63 | 0.67 | 0.089 | 0.13 | 0.082 | 0.062 | minute amount |

TABLE 2

| Zn (%) | Pb (%) | Fe (%) | Cu (%) | Cd (%) | Sn (%) | Si (%) |
|---|---|---|---|---|---|---|
| 47.01 | — | — | — | — | — | — |

Specifically, at the leaching step 101, the powdery electric arc furnace dust 1 or the powdery secondary dust 1 is dispersed and immersed in a molten zinc chloride bath (not shown) prepared beforehand, and the chlorine gas 8 is blown into the molten zinc chloride bath. At the leaching step 101, a reaction of substituting an oxygen component constituting metal oxide in the electric arc furnace dust 1 or in the secondary dust 1 by chlorine proceeds to extract the crude zinc chloride 3, thereby producing an oxygen gas 2 as a by-product. Regarding metal components such as Fe contained in the electric arc furnace dust 1 or the secondary dust 1, a part thereof is extracted together with a zinc component and mixed in the crude zinc chloride 3 as chloride, and the remainder thereof is separated as a residue 4. From a viewpoint that the zinc production method can be performed in a closed cycle, it is favorable to use gas produced as a by-product in an anode at an electrolysis step 103 described later as the chlorine gas 8 to be used at the leaching step 101.

Next, at a purification step 102, the crude zinc chloride 3 having the composition shown in Table 2, obtained in the leaching step 101, is distilled and purified to obtain purified zinc chloride 6.

Specifically, at the purification step 102, the crude zinc chloride 3 is stored in a crucible arranged in a muffle furnace and the temperature in the muffle furnace is maintained at 600□C, and the crude zinc chloride 3 is heated and melted in the crucible to maintain a melt thereof at 600□C and the pressure in the muffle furnace is maintained at a gauge pressure of 200 pascals or lower. Subsequently, the melt of the crude zinc chloride 3 gasifies to produce zinc chloride vapor. The produced zinc chloride vapor is cooled and condensed, and distilled, that is, distilled to obtain the purified zinc chloride 6 having a composition shown in Table 3. At this time, a metal chloride component 5 having a lower boiling point than that of zinc chloride gasifies earlier than zinc chloride, and is separated from the zinc chloride vapor. On the other hand, a metal chloride component 7 having a higher boiling point than that of zinc chloride remains in the crucible as liquid after zinc chloride has gasified.

TABLE 3

| Zn (%) | Pb (%) | Fe (%) | Cu (%) | Cd (%) | Sn (%) | Si (%) |
|---|---|---|---|---|---|---|
| 47.60 | 0.00005 | 0.00002 | 0.00001 | 0.00001 | 0.00002 | — |

Typically, the pressure in the muffle furnace is controlled so that the total pressure of a gas phase coming in contact with the crude zinc chloride 3 is maintained at a gauge pressure of 200 pascals or lower, by controlling a supply system (not shown) of an inert gas automatically or manually to blow the inert gas such as a nitrogen gas into the muffle furnace. The pressure only needs to be a pressure sufficient for producing the zinc chloride vapor from the melt in which the crude zinc chloride 3 melts, and a lower limit thereof depends on airtight performance of the muffle furnace. That is, the pressure can be reduced more than the atmospheric pressure so long as the muffle furnace does not suck external air, and an upper limit thereof is preferably a gauge pressure of 200 pascals or lower, taking into consideration the convenience of the configuration of the supply system of the inert gas and the muffle furnace. The pressure in the muffle furnace in a steady state is equal to the pressure of the gas phase coming in contact with the melt of the crude zinc chloride 3 in the crucible.

The temperature in the muffle furnace can be a temperature sufficient for melting the crude zinc chloride 3 and maintaining a molten state thereof by controlling a heating mechanism (not shown) automatically or manually. The lower limit thereof needs to be a temperature sufficient for maintaining the temperature of the melt of the crude zinc chloride 3 in the crucible at 250□C or higher, and the upper limit thereof is preferably a temperature for maintaining the temperature of the melt of the crude zinc chloride 3 in the crucible at 750□C or lower, taking into consideration the convenience of the configuration of the muffle furnace and the heating mechanism (not shown). The temperature of the muffle furnace in a steady state is equal to the temperature of the melt of the crude zinc chloride 3 in the crucible.

The muffle furnace and the crucible arranged therein are not shown. The crude zinc chloride 3 may be distilled by using a general distillation device, which is lined with alumina or ceramics such as silicon carbide having corrosion resistance with respect to high-temperature metal chloride, instead of the muffle furnace and the crucible arranged therein.

Next, at the electrolysis step 103, the purified zinc chloride 6 having the composition shown in Table 3, obtained through the purification step 102, is stored in an electrolytic bath and melted by maintaining the bath temperature thereof at 500□C. The purified zinc chloride 6 in a molten state is electrolyzed to obtain zinc melt 9 containing metal zinc, and the chlorine gas 8 is produced as a by-product. When the zinc melt 9 containing metal zinc is cooled and solidified to be subjected to composition analysis, a result shown in Table 4 is obtained. As the electrolytic bath used at the electrolysis step 103, an electrolytic bath lined with ceramics that houses a carbon electrode thetein can be used as an example.

TABLE 4

| Zn (%) | Pb (%) | Fe (%) | Cu (%) | Cd (%) | Sn (%) | Si (%) |
|---|---|---|---|---|---|---|
| 99.99 | 0.0002 | 0.0008 | 0.001 | 0.0001 | 0.0002 | — |

The method of the present embodiment described above includes the leaching step 101 of bringing the electric arc furnace dust 1 containing zinc oxide or the secondary dust 1 containing zinc oxide generated at the time of reducing the electric arc furnace dust 1 in a reduction furnace into contact with the chlorine gas 8 to extract a zinc oxide component in the electric arc furnace dust 1 or in the secondary dust 1 as the crude zinc chloride 3, the purification step 102 of heating the crude zinc chloride 3 extracted at the leaching step 101 to produce zinc chloride vapor, and cooling and condensing the zinc chloride vapor, thereby obtaining the purified zinc chloride 6, and the electrolysis step 103 of electrolyzing the purified zinc chloride 6 obtained at the purification step 102 in a molten state to obtain the zinc melt 9 and the chlorine gas 8. Consequently, a zinc production method that is suitable for treatment of the electric arc furnace dust or the like containing a large amount of chlorine without requiring any additional cost for dechlorination, can produce high-purity zinc bare metal having a purity of 4N or higher, and enables operations with a compact device can be realized.

According to the method of the present embodiment, at the leaching step 101, the electric arc furnace dust 1 or the secondary dust 1 is brought into contact with the chlorine gas 8 obtained by the electrolysis at the electrolysis step 103, thereby enabling to realize a zinc production method that decreases generation of waste.

Furthermore, according to the method of the present embodiment, at the purification step 102, the crude zinc chloride 3 is heated and melted, and in a state in which the temperature of the melt phase thereof is maintained in a range from 250□C to 750□C inclusive, the pressure of the gas phase adjacent to the melt phase is maintained at a gauge pressure of 200 pascals or lower, thereby enabling to produce and condense the zinc chloride vapor corresponding to the vapor partial pressure at the temperature and to obtain high-purity zinc chloride.

Second Embodiment

A zinc production method according to a second embodiment of the present invention is described next in detail with reference to FIG. 2.

Figure 2:
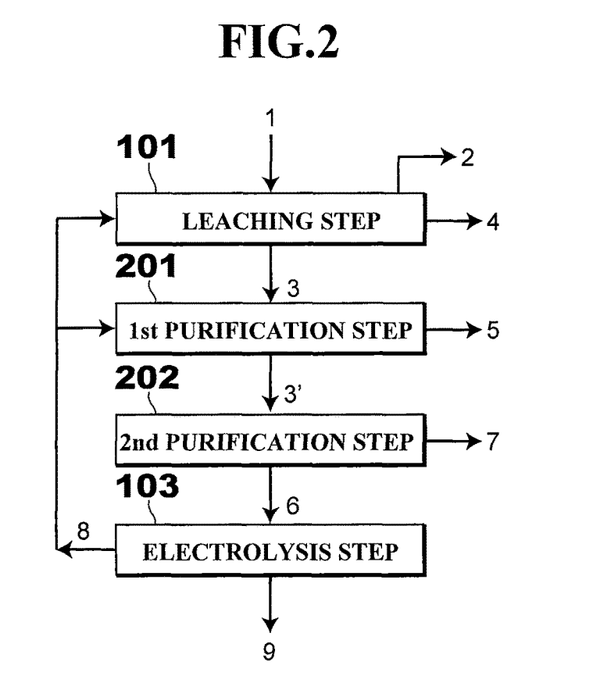
FIG. 2 is a process chart of a zinc production method according to a second embodiment of the present invention.

FIG. 2 shows steps of the zinc production method according to the second embodiment of the present invention.

The zinc production method according to the present embodiment is mainly different from the zinc production method according to the first embodiment in that the purification step 102 is segmented into a first purification step 201 and a second purification step 202, both using a muffle furnace and a crucible arranged therein. In the present embodiment, explanations are given while focusing on the above difference, and constituent elements identical to those of the first embodiment are denoted by like reference numerals and the explanations thereof will be omitted.

First, the leaching step 101 being a reaction step of obtaining the crude zinc chloride 3 from the zinc oxide component in the electric arc furnace dust 1 or the secondary dust 1 is the same as that of the first embodiment.

The first purification step 201 and the second purification step 202 according to the present embodiment are described next. First, distillation at the purification step 102 described in the first embodiment is performed in such a manner that the zinc chloride component in the crude zinc chloride 3 is gasified, condensed, and distilled to obtain the purified zinc chloride 6, which is then supplied to the electrolysis step 103 as an electrolysis bath.

However, in some of the metal components, being impurities mixed in the crude zinc chloride 3, the boiling point thereof decreases due to oxidation. Therefore, by handling this problem, zinc chloride having higher purity can be obtained.

Therefore, first, at the first purification step 201 according to the present embodiment, the crude zinc chloride 3 containing impurities obtained at the leaching step 101, which is the same as that of the first embodiment, is maintained at a temperature range from 50°C to 450°C inclusive, in a state in which the pressure of a gas phase adjacent thereto is maintained within a range of a gauge pressure of 200 pascals or lower. At the first purification step 201, by bringing the crude zinc chloride 3 containing impurities in this state into contact with the chlorine gas 8, to oxidize metal components, being impurities other than zinc contained in the crude zinc chloride 3, thereby turning the metal components into metal chloride having a lower boiling point than that of zinc chloride, and then the metal chloride is gasified and distilled, while maintaining a heated state thereof.

Specifically, $FeCl_2$, $SnCl_2$, and $PbCl_2$ being metal components other than zinc contained in the crude zinc chloride 3 are respectively oxidized to $FeCl_3$, $SnCl_4$, and $PbCl_4$ to become the metal chloride component 5 having a lower boiling point than that of zinc chloride. The metal chloride component 5 is gasified earlier than zinc chloride and separated from the zinc chloride vapor. At this time, as the chlorine gas 8, it is preferable to use a chlorine gas 8 produced as a by-product in the anode at the electrolysis step 103, because the zinc production method can be performed in a closed cycle.

The pressure in the muffle furnace to be used at the first purification step 201 is controlled typically so that the total pressure of the gas phase coming in contact with the crude zinc chloride 3 is maintained at a gauge pressure of 200 pascals or lower, by controlling a supply system (not shown) of an inert gas automatically or manually to blow the inert gas such as a nitrogen gas into the muffle furnace. Further, the pressure only needs to be a pressure sufficient for producing metal chloride vapor from the melt in which metal chloride resulting from impurities contained in the crude zinc chloride 3 melts, and a lower limit thereof is preferably a gauge pressure of −200 pascals in view of the airtight performance of the muffle furnace. On the other hand, an upper limit thereof is preferably a gauge pressure of 200 pascals or lower, taking into consideration the convenience of the configuration of the supply system of the inert gas and the muffle furnace.

The temperature in the muffle furnace only needs to be a temperature sufficient for melting metal chloride resulting from impurities contained in the crude zinc chloride 3 and maintaining a molten state by controlling a heating mechanism (not shown) automatically or manually. The lower limit thereof needs to be temperature sufficient for maintaining the temperature of the melt of the metal chloride in the crucible at 50°C or higher, and the upper limit thereof is preferably a temperature sufficient for maintaining the temperature of the melt of the metal chloride in the crucible at 450°C or lower, taking into consideration the convenience of the configuration of the muffle furnace and the heating mechanism (not shown).

Next, at the second purification step 202, the purified zinc chloride 6 is obtained by gasifying and distilling a zinc chloride component from crude zinc chloride 3' having undergone the first purification step 201.

Specifically, at the second purification step 202, anhydrous zinc chloride being a main component of the crude zinc chloride 3' is heated and gasified while being melted. At this time, at the second purification step 202, as at the purification step 102 described in the first embodiment, the crude zinc chloride 3' is heated and melted, and in a state in which a temperature of the melt phase thereof is maintained in a range from 250°C to 750°C inclusive, the zinc chloride vapor is produced by maintaining the pressure of the gas phase adjacent to the melt phase at 200 pascals or lower. The produced zinc chloride vapor is cooled, condensed, and distilled to obtain the purified zinc chloride 6 separated from the metal chloride component 7 having a higher boiling point than that of zinc chloride. The metal chloride component 7 containing, as a main component, calcium chloride, or the like having a higher boiling point than that of zinc chloride remains as liquid after zinc chloride has been gasified.

The purified zinc chloride 6 obtained at the second purification step 202 is delivered to the next electrolysis step 103, which is the same as that of the first embodiment.

According to the present embodiment described above, the zinc production method includes the leaching step 101 of bringing the electric arc furnace dust 1 containing zinc oxide or the secondary dust 1 containing zinc oxide generated at the time of reducing the electric arc furnace dust 1 in the reduction furnace into contact with the chlorine gas 8 to extract the zinc oxide component in the electric arc furnace dust 1 or in the secondary dust 1 as the crude zinc chloride 3, the first purification step 201 of bringing the crude zinc chloride 3 extracted at the leaching step 101 into contact with the chlorine gas 8 in a molten state, to oxidize metal components other than zinc in the crude zinc chloride 3, thereby turning the metal components into the metal chloride 5 having a lower boiling point than that of zinc chloride, and then heating the crude zinc chloride 3 to evaporate and separate the metal chloride 5 therefrom, the second purification step 202 of heating the crude zinc chloride 3' having undergone the first purification step 201 to produce zinc chloride vapor, and cooling and condensing the zinc chloride vapor to obtain the purified zinc chloride 6, and the electrolysis step 103 of electrolyzing the purified zinc chloride 6 obtained at the second purification step 202 in a molten state to obtain the zinc melt 9 and the chlorine gas 8. Consequently, a zinc production method that is suitable for treatment of the electric arc furnace dust or the like containing a large amount of chlorine without requiring any additional cost for dechlorination, can produce zinc bare metal having a high purity of 4N or higher, and enables operations with a compact device can be realized.

According to the method of the present embodiment, at the first purification step 201, the crude zinc chloride 3 is brought into contact with the chlorine gas 8 obtained by the electrolysis at the electrolysis step 103, thereby enabling to realize a zinc production method that can decrease generation of waste.

According to the method of the present embodiment, at the first purification step 201, the crude zinc chloride 3 is maintained in a temperature range from 50°C to 450°C inclusive, in a state in which the pressure of the gas phase adjacent thereto is maintained within a range of a gauge pressure of 200 pascals or lower, thereby evaporating a low-boiling point component corresponding to the vapor partial pressure at the temperature. Accordingly, impurities contained in the crude zinc chloride can be removed.

According to the method of the present embodiment, at the second purification step 202, the crude zinc chloride 3' is heated and melted, and in a state in which the temperature of the melt phase thereof is maintained in a range from 250°C to 750°C inclusive, the zinc chloride vapor corresponding to the partial pressure at the temperature can be produced and condensed by maintaining the pressure of the gas phase adjacent to the melt phase at a gauge pressure of 200 pascals or lower, thereby enabling to obtain high-purity zinc chloride.

Third Embodiment

A zinc production method according to a third embodiment of the present invention is described next in detail with reference to FIG. 3.

Figure 3:
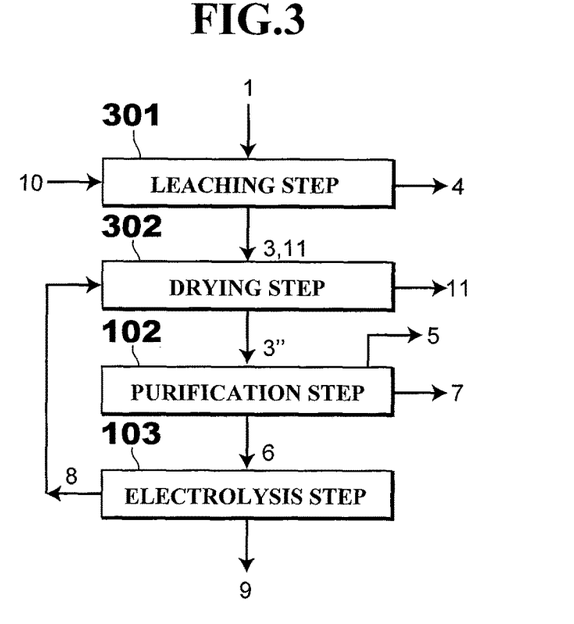
FIG. 3 is a process chart of a zinc production method according to a third embodiment of the present invention.

FIG. 3 shows steps of the zinc production method according to the third embodiment of the present invention.

The zinc production method according to the present embodiment is mainly different from the zinc production method according to the first embodiment in that the leaching step 101 is replaced by a new leaching step 301 and a drying step 302 is added thereto. In the present embodiment, explanations are given while focusing on the above difference, and constituent elements identical to those of the first embodiment are denoted by like reference numerals and the explanations thereof will be omitted.

First, at the leaching step 301, being a reaction step to obtain the crude zinc chloride 3 from the zinc oxide component in the electric arc furnace dust 1 or in the secondary dust 1, hydrochloric acid 10 is used instead of the chlorine gas 8 in the first embodiment. That is, at the leaching step 301, the hydrochloric acid 10 is brought into contact with the electric arc furnace dust 1 or the secondary dust 1 having the composition shown in Table 1 described above in a tubular furnace, to extract a zinc oxide component in the electric arc furnace dust 1 or in the secondary dust 1 as the crude zinc chloride 3. In this case, at the leaching step 301, water 11 is produced as a by-product instead of the oxygen gas 2. Regarding the metal component such as iron contained in the electric arc furnace dust 1 or in the secondary dust 1, a part thereof is extracted together with the zinc component and mixed in the crude zinc chloride 3 as chloride, and the remainder thereof is separated as the residue 4.

At the leaching step 301, water can be used simultaneously with the hydrochloric acid 10, to extract the crude zinc chloride 3 as liquid. As a method of using water simultaneously, water can be added as water vapor together with the hydrochloric acid 10 to the electric arc furnace dust 1 or the secondary dust 1, or after water is added to and kneaded with the solid electric arc furnace dust 1 or secondary dust 1 beforehand and the hydrochloric acid 10 can be brought into contact therewith. Alternatively, crude zinc chloride can be obtained as an aqueous solution containing zinc chloride as a main component, by blowing the hydrochloric acid (gas) 10 into slurry prepared by adding water beforehand to the solid electric arc furnace dust 1 or secondary dust 1. When water is used simultaneously with the hydrochloric acid 10, at the purification step 102 in the subsequent stage, a low-quality material containing a large amount of impurities can be also handled by simultaneously using a wet fluid cleaning method, which has been in operation widely in industrial fields. As such a wet fluid cleaning method, a method of settling and separating metal components in impurities as hydroxide by adding an alkaline agent to an aqueous solution of crude zinc chloride to control the pH thereof can be mentioned.

Further, the crude zinc chloride obtained as the aqueous solution can be also prepared so as to become a saturated aqueous solution of zinc chloride and zinc chloride can be supplementarily separated therefrom and purified by crystallizing and filtering zinc chloride. According to this method, a low-quality material containing a large amount of impurities can be also handled, and the consumption of thermal energy for evaporating moisture at the time of thermal dehydration can be decreased.

As the hydrochloric acid 10 used at the leaching step 301, the chlorine gas 8 produced as a by-product in the anode at the electrolysis step 103 is preferably used as a raw material, from a viewpoint that the zinc production method can be performed in a closed cycle. Specifically, a method of producing the hydrochloric acid 10 by reacting and synthesizing the chlorine gas 8 with a hydrogen gas can be mentioned. The hydrogen gas can be obtained by a method of using water vapor to reform LP gas. Further, such a method can be adopted that the chlorine gas 8 mixed with water vapor is brought into contact with a carbon material such as red-burning cokes to directly synthesize the hydrochloric acid 10. At the time of synthesizing the hydrochloric acid, carbon dioxide is produced as a by-product.

Next, at the drying step 302, the water 11 produced as a by-product at the leaching step 301 is separated from the crude zinc chloride 3, and the crude zinc chloride 3 is brought into contact with the chlorine gas 8 to obtain anhydrous crude zinc chloride 3". For example, at the drying step 302, after the water 11 produced as a by-product at the leaching step 301 is heated up to 400°C by a heating mechanism (not shown) and turned into water vapor, to evaporate and separate the water vapor from the crude zinc chloride 3, the crude zinc chloride 3 is brought into contact with the chlorine gas 8, thereby obtaining the anhydrous crude zinc chloride 3" having a composition shown in Table 5.

TABLE 5

| Zn (%) | Pb (%) | Fe (%) | Cu (%) | Cd (%) | Sn (%) | Si (%) |
|---|---|---|---|---|---|---|
| 44.10 | 1.2944 | 0.0137 | 0.00006 | 0.00007 | 0.00006 | 0.00003 |

At this time, from a viewpoint that the zinc production method can be performed in a closed cycle, it is favorable to use the chlorine gas 8 produced as a by-product in the anode at the electrolysis step 103 as the chlorine gas 8.

The anhydrous crude zinc chloride 3" obtained at the drying step 302 is then delivered to the purification step 102 in the subsequent stage, being the same as that of the first embodiment. After the purification step 102, the electrolysis step 103 same as that of the first and second embodiments is performed.

According to the method of the present embodiment described above, the zinc production method includes the leaching step 301 of bringing the electric arc furnace dust 1 containing zinc oxide or the secondary dust 1 containing zinc oxide generated at the time of reducing the electric arc furnace dust 1 in the reduction furnace into contact with the hydrochloric acid 1, to extract the zinc oxide component in the electric arc furnace dust 1 or in the secondary dust 1 as the crude zinc chloride 3, and the drying step 302 of bringing the crude zinc chloride 3 extracted at the leaching step 301 into contact with the chlorine gas 8, after the crude zinc chloride 3 is heated to separate the water 11 contained in the crude zinc chloride 3 therefrom as water vapor. The zinc production method also includes the purification step 102 of heating the crude zinc chloride 3″ having undergone the drying step 302 to produce zinc chloride vapor, and cooling and condensing the zinc chloride vapor to obtain the purified zinc chloride 6, and the electrolysis step 103 of electrolyzing the purified zinc chloride 6 obtained at the purification step 102 in a molten state to obtain the zinc melt 9 and the chlorine gas 8. Consequently, a zinc production method that is suitable for treatment of the electric arc furnace dust or the like containing a large amount of chlorine without requiring any additional cost for dechlorination, can produce zinc bare metal having a high purity of 4N or higher, and enables operations with a compact device can be realized.

According to the method of the present embodiment, at the leaching step 301, the electric arc furnace dust 1 or the secondary dust 1 is brought into contact with the hydrochloric acid 10 produced by using the chlorine gas 8 obtained by the electrolysis at the electrolysis step 302 as a raw material, thereby enabling to realize a zinc production method that can decrease generation of waste.

According to the method of the present embodiment, at the leaching step 301, as water is used simultaneously at the time of bringing the electric arc furnace dust 1 or the secondary dust 1 into contact with the hydrochloric acid 10, it is possible to realize a zinc production method that can handle a low-quality material containing a large amount of impurities.

Furthermore, according to the method of the present embodiment, at the drying step 302, the crude zinc chloride 3 after the water 11 is separated therefrom as water vapor is brought into contact with the chlorine gas 8 obtained by the electrolysis at the electrolysis step 102, thereby enabling to realize a zinc production method that can decrease generation of waste.

Fourth Embodiment

A zinc production method according to a fourth embodiment of the present invention is described next in detail with reference to FIG. 4.

Figure 4:
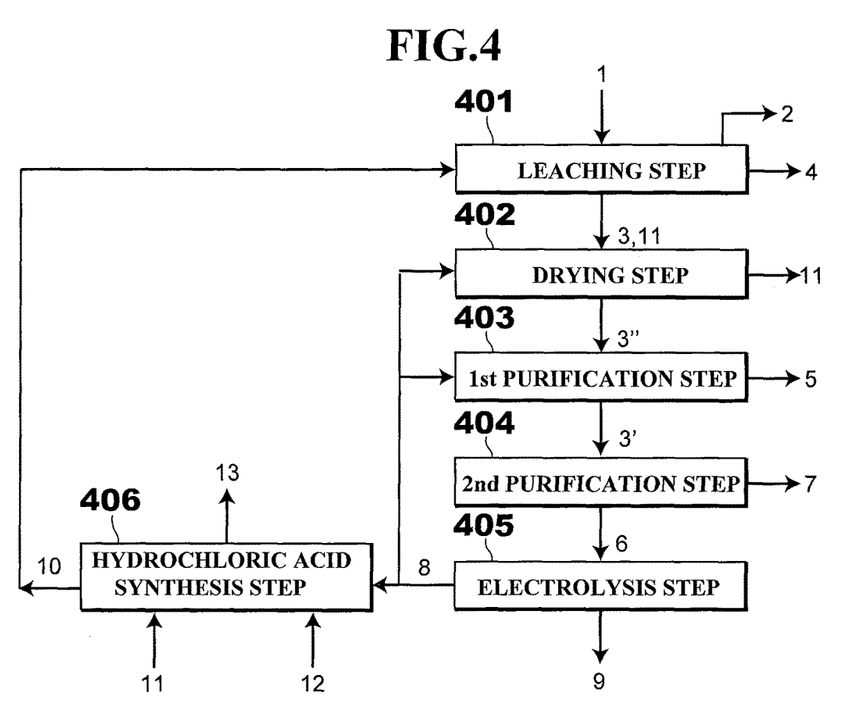
FIG. 4 is a process chart of a zinc production method according to a fourth embodiment of the present invention.

FIG. 4 shows steps of the zinc production method according to the fourth embodiment of the present invention.

The zinc production method according to the present embodiment is mainly different from the zinc production method according to the first embodiment in that the leaching step 101 is replaced by a new leaching step 401, a drying step 402 is further added, the purification step 102 is segmented into a first purification step 403 and a second purification step 404 both using a muffle furnace and a crucible arranged therein, and a hydrochloric acid synthesis step 406 is further added. In the present embodiment, explanations are given while focusing on the above difference, and constituent elements identical to those of the first embodiment are denoted by like reference numerals and the explanations thereof will be omitted.

First, at the leaching step 401, which is a reaction step to obtain the crude zinc chloride 3 from the zinc oxide component in the electric arc furnace dust 1 or in the secondary dust 1, the hydrochloric acid 10 is used instead of the chlorine gas 8 of the first embodiment. That is, the leaching step 401 is the same as the leaching step 301 according to the third embodiment.

Next, at the drying step 402, the water 11 produced as a by-product at the leaching step 401 is heated up to 400□C by a heating mechanism (not shown) to separate and remove the water 11 as water vapor, to turn the crude zinc chloride 3 into anhydrous salt. That is, the drying step 402 is the same as the drying step 302 according to the third embodiment.

Subsequently, at the first purification step 403, the crude zinc chloride 3″ containing impurities, which are obtained at the drying step 402, is brought into contact with the chlorine gas 8 to oxidize metal components, being impurities other than zinc contained in the crude zinc chloride 3″, thereby turning the metal components into metal chloride having a lower boiling point than that of zinc chloride, and then the metal chloride is gasified and distilled. That is, the first purification step 403 is the same as the first purification step 201 according to the second embodiment, although using the crude zinc chloride 3″ being anhydrous salt.

Next, at the second purification step 404, the zinc chloride component is gasified and distilled from the crude zinc chloride 3′ having undergone the first purification step 403, thereby obtaining the purified zinc chloride 6. That is, the second purification step 404 is the same as the second purification step 202 according to the second embodiment.

Subsequently, at an electrolysis step 405, the purified zinc chloride 6 obtained at the second purification step 404 is electrolyzed in a molten state to obtain the zinc melt 9 containing high-purity metal zinc and the chlorine gas 8. That is, the electrolysis step 405 is the same as the electrolysis step 103 according to the first to third embodiments.

Next, at the hydrochloric acid synthesis step 406, the hydrochloric acid 10 is produced by using as a raw material the chlorine gas 8 produced as a by-product in the anode at the electrolysis step 103. Specifically, at the hydrochloric acid synthesis step 406, the chlorine gas 8 is reacted and synthesized with a hydrogen gas to produce the hydrochloric acid 10. The hydrogen gas is obtained by a method such as a water-gas-shift reaction that reforms an LP gas by using the water vapor 11. A method of directly synthesizing the hydrochloric acid 10 by bringing the chlorine gas 8 mixed with the water vapor 11 into contact with a red-heated carbon material 12 can be also adopted. At the time of synthesizing the hydrochloric acid, carbon dioxide 13 is produced as a by-product.

According to the method of the present embodiment, the zinc production method includes the leaching step 401 of bringing the electric arc furnace dust 1 containing zinc oxide or the secondary dust 1 containing zinc oxide generated at the time of reducing the electric arc furnace dust 1 in the reduction furnace into contact with the hydrochloric acid 10 to extract the zinc oxide component in the electric arc furnace dust 1 or in the secondary dust 1 as the crude zinc chloride 3, and the drying step 402 of bringing the crude zinc chloride 3 extracted at the leaching step 401 into contact with the chlorine gas 8, after the crude zinc chloride 3 is heated to separate the water 11 contained in the crude zinc chloride 3 as water vapor. The zinc production method further includes the first purification step 403 of bringing the crude zinc chloride 3″ having undergone the drying step 402 into contact with the chlorine gas 8, to oxidize metal components other than zinc in the crude zinc chloride 3″, thereby turning the metal components into the metal chloride 5 having a lower boiling point than that of zinc chloride, and then heating the crude zinc chloride 3″, to evaporate and separate the metal chloride component 5 therefrom. The zinc production method further includes the second purification step 404 of heating the crude zinc chloride 3″ having undergone the first purification step 403 to produce zinc chloride vapor, and cooling and condensing the zinc chloride vapor to obtain the purified zinc chloride 6, and the electrolysis step 405 of electrolyzing the purified zinc chloride 6 obtained at the second purification step 404 in a molten state to obtain the zinc melt 9 and the chlorine gas 8. Consequently, a zinc production method that is suitable for treatment of the electric arc furnace dust or the like containing a large amount of chlorine without requiring any additional cost for dechlorination, can produce zinc bare metal having a high purity of 4N or higher, and enables operations with a compact device can be realized.

According to the method of the present embodiment, at the leaching step 401, the electric arc furnace dust 1 or the secondary dust 1 is brought into contact with the hydrochloric acid 10 produced by using as a raw material the chlorine gas 8 obtained by the electrolysis at the electrolysis step 405, thereby enabling to realize a zinc production method that can decrease generation of waste.

Fifth Embodiment

A zinc production method according to a fifth embodiment of the present invention is described next in detail with reference to FIG. 5.

Figure 5:
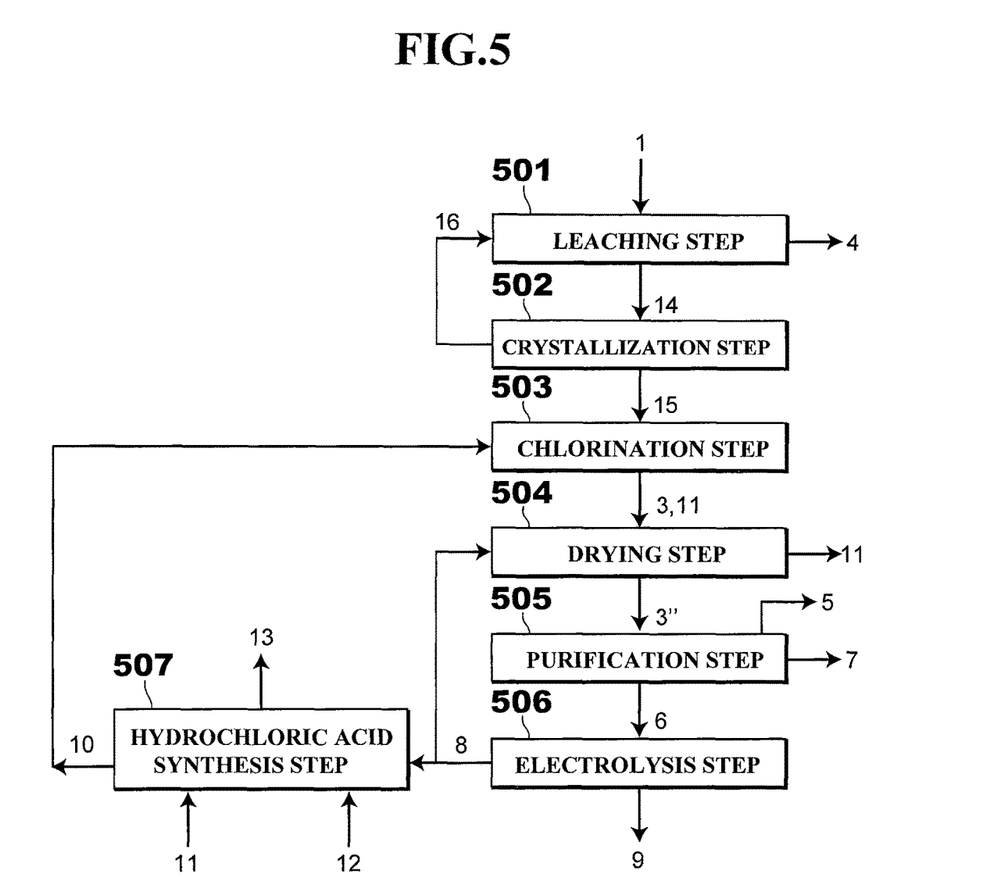
FIG. 5 is a process chart of a zinc production method according to a fifth embodiment of the present invention.

FIG. 5 shows steps of the zinc production method according to the fifth embodiment of the present invention.

The zinc production method according to the present embodiment is mainly different from the zinc production method according to the first embodiment in that a leaching step 501, a crystallization step 502, and a chlorination step 503 are used instead of the leaching step 101 as the reaction step to obtain the crude zinc chloride 3 from the zinc oxide component in the electric arc furnace dust 1 or in the secondary dust 1, and a hydrochloric acid synthesis step 507 is further added. In the fifth embodiment, explanations are given while focusing on the above difference, and constituent elements identical to those of the first embodiment are denoted by like reference numerals and the explanations thereof will be omitted.

First, at the leaching step 501, an aqueous solution 16 of an alkaline agent is used. That is, at the leaching step 501, the zinc oxide component in the electric arc furnace dust 1 or in the secondary dust 1 having the composition shown in Table 1 described above is brought into contact with a aqueous solution of sodium hydroxide, being the aqueous solution 16 of an alkaline agent, maintained in a concentration of 48% and at 100□C by a heating mechanism (not shown), while being stirred in a stainless steel beaker (not shown), to turn the zinc oxide component in the electric arc furnace dust 1 or in the secondary dust 1 into zinc hydroxide, thereby extracting a leaching solution 14 containing the zinc hydroxide. As the aqueous solution 16 of an alkaline agent, it is preferred to use the aqueous solution of an alkaline agent produced at the crystallization step 502 described later, because the zinc production method can be performed in a closed cycle. In this case, a reaction formula between the aqueous solution of sodium hydroxide and zinc oxide is shown in a chemical formula (1), and the zinc hydroxide component in the leaching solution 14 exists in solution as complex ion such as $Zn(OH)_4^{2-}$. At steps subsequent to the leaching step 501, the crude zinc chloride 3 containing the water 11, which is obtained by converting a zinc component contained in the extracted leaching solution 14 into zinc chloride, is dried, purified, and treated by the molten salt electrolysis method.

$$2NaOH + ZnO + H_2O \rightarrow Na_2Zn(OH)_4 \qquad \text{[Chemical formula 1]}$$

As the alkaline agent for the aqueous solution 16 of an alkaline agent, sodium hydroxide or potassium hydroxide that can dissolve the zinc oxide component selectively without dissolving an iron component in the aqueous solution can be preferably used. Therefore, the treatment at the leaching step 501 can be said to be particularly effective for treatment of dust containing a large amount of iron components. Further, the electric arc furnace dust 1 or the secondary dust 1 having undergone the leaching step 501 is not contaminated by an acid or chlorine component, and in the case of treatment of the electric arc furnace dust 1 or the secondary dust 1 containing a chlorine component, the chlorine component can be dissolved and removed by the aqueous solution 16 of an alkaline agent. Therefore, the present embodiment is particularly effective when the electric arc furnace dust 1 or the secondary dust 1 having undergone the leaching step 501 is utilized as an iron-making raw material or the like.

At the leaching step 501, regarding the metal component such as iron contained in the electric arc furnace dust 1 or in the secondary dust 1, a part thereof is extracted together with the zinc component and mixed in the crude zinc chloride 3 as chloride, and the remainder thereof is separated therefrom as the residue 4.

Subsequently, at the crystallization step 502, the leaching solution 14 is cooled and turned into a saturated solution of zinc hydroxide, and zinc hydroxide ($Zn(OH)_2$) 15 is precipitated and settled as a solid, and then filtered by a Nutsche (not shown) and separated therefrom. The reaction formula is shown in the following chemical formula (2).

$$2NaZn(OH)_4 \rightarrow Zn(OH)_2 + 2NaOH \qquad \text{[Chemical formula 2]}$$

The leaching solution 14 after separating and recovering the zinc hydroxide 15 therefrom can be repeatedly and cyclically used as the aqueous solution 16 of an alkaline agent, which is convenient. Separation of the zinc hydroxide 15 can be performed by filtration by a filter press or the like or centrifugal separation. To increase the reaction speed, it is favorable that the leaching solution 14 is hot alkali at a temperature of 50□C or higher. Further, although various conditions of the composition, temperature, and the like of the leaching solution 14 and the aqueous solution 16 of an alkaline agent cyclically used depend on the quality level of the raw material, the leaching solution 14 and the aqueous solution 16 of an alkaline agent can be adjusted by a general method.

Next, at the chlorination step 503, an aqueous solution of zinc chloride is obtained by adding 35% hydrochloric acid 10 to separated and recovered crystals of the zinc hydroxide 15 and bringing the hydrochloric acid 10 into contact therewith. The aqueous solution of zinc chloride is evaporated to dryness, thereby obtaining the crude zinc chloride 3 having the composition shown in Table 1 described above and the water 11. At this time, as the hydrochloric acid 10, it is preferred to use the hydrochloric acid 10 produced at the hydrochloric acid synthesis step 507 described later, because the zinc production method can be performed in a closed cycle.

Subsequently, at the drying step 504, the water 11 obtained at the chlorination step 503 is heated to be separated and dehydrated as water vapor, thereby turning the crude zinc chloride 3 into anhydrous salt. That is, the drying step 504 is the same as the drying step 302 according to the third embodiment and the drying step 402 according to the fourth embodiment.

Next, at the purification step 505, the crude zinc chloride 3″ having the composition shown in Table 2 described above, which is obtained through the drying step 504, is distilled and purified to obtain the purified zinc chloride 6 having the composition shown in Table 3 described above.

That is, the purification step 505 is the same as the purification step 102 according to the first and second embodiments.

Subsequently, at the electrolysis step 506, the purified zinc chloride 6 having the composition shown in Table 3 described above, which is obtained through the purification step 505, is electrolyzed in a molten state to obtain the zinc melt 9 containing high-purity metal zinc and the chlorine gas 8. That is, the electrolysis step 506 is the same as the electrolysis step 103 according to the first to third embodiments and the electrolysis step 405 according to the fourth embodiment.

Next, at the hydrochloric acid synthesis step 507, the hydrochloric acid 10 is produced by using the chlorine gas produced as a by-product in the anode at the electrolysis step 506 as a raw material. That is, the hydrochloric acid synthesis step 507 is the same as the hydrochloric acid synthesis step 406 according to the fourth embodiment.

According to the method of the present embodiment described above, the zinc production method includes the leaching step 501 of bringing the electric arc furnace dust 1 containing zinc oxide or the secondary dust 1 generated at the time of reducing the electric arc furnace dust 1 in the reduction furnace into contact with the aqueous solution 16 of an alkaline agent to turn the zinc oxide component in the electric arc furnace dust 1 or in the secondary dust 1 into zinc hydroxide, thereby obtaining the leaching solution 14 containing the zinc hydroxide, the crystallization step 502 of turning the leaching solution 14 obtained at the leaching step 501 into the saturated solution of zinc hydroxide and precipitating and settling the zinc hydroxide 15 from the saturated solution, thereby separating and recovering the zinc hydroxide 15 therefrom as a solid, and the chlorination step 503 of bringing the zinc hydroxide 15 separated and recovered at the crystallization step 502 into contact with the hydrochloric acid 10 to obtain the crude zinc chloride 3. Further, the zinc production method includes the drying step 504 of heating the crude zinc chloride 3 obtained at the chlorination step 503 and bringing the crude zinc chloride 3 into contact with the chlorine gas 8, after the water 11 contained in the crude zinc chloride 3 is separated therefrom as water vapor, the purification step 505 of heating the crude zinc chloride 3" having undergone the drying step 504 to produce zinc chloride vapor, and cooling and condensing the zinc chloride vapor to obtain the purified zinc chloride 6, and the electrolysis step of electrolyzing the purified zinc chloride 6 obtained at the purification step 505 in a molten state, thereby obtaining the zinc melt 9 and the chlorine gas 8. Consequently, a zinc production method that is suitable for treatment of an electric arc furnace dust or the like containing a large amount of chlorine without requiring any additional cost for dechlorination, can produce zinc bare metal having a high purity of 4N or higher, and enables operations with a compact device can be realized.

According to the method of the present embodiment, at the leaching step 501, the aqueous solution after the zinc hydroxide 15 has been separated and recovered therefrom at the crystallization step 502 is reused as the aqueous solution 16 of an alkaline agent, thereby enabling to realize a zinc production method that can decrease generation of waste.

According to the method of the present embodiment, at the chlorination step 503, the zinc hydroxide 15 separated and recovered at the crystallization step 502 is brought into contact with the hydrochloric acid produced by using the chlorine gas 8 obtained by the electrolysis at the electrolysis step 506 as a raw material, thereby enabling to realize a zinc production method that can decrease generation of waste.

Furthermore, according to the method of the present embodiment, the alkaline agent in the aqueous solution 16 of an alkaline agent is sodium hydroxide or potassium hydroxide, thereby enabling to realize a zinc production method that can dissolve selectively a zinc oxide component without dissolving an iron component in an aqueous solution.

Sixth Embodiment

A zinc production method according to a sixth embodiment of the present invention is described next in detail with reference to FIG. 6.

Figure 6:
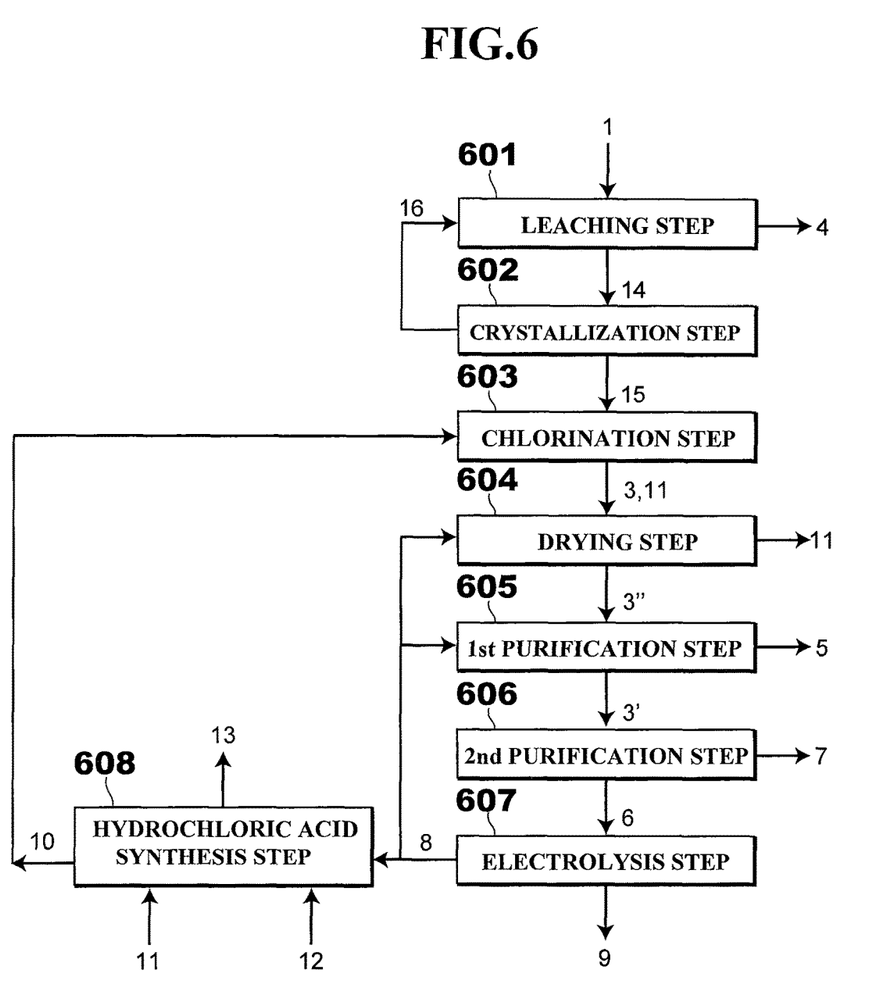
FIG. 6 is a process chart of a zinc production method according to a sixth embodiment of the present invention.

FIG. 6 shows steps of the zinc production method according to the sixth embodiment of the present invention.

The zinc production method according to the present embodiment is mainly different from the zinc production method according to the first embodiment in that a leaching step 601, a crystallization step 602, and a chlorination step 603 are used instead of the leaching step 101, as the reaction step to obtain the crude zinc chloride 3 from the zinc oxide component in the electric arc furnace dust 1 or the secondary dust 1, the purification step 102 is segmented into a first purification step 605 and a second purification step 606 both using a muffle furnace and a crucible arranged therein, and a hydrochloric acid synthesis step 608 is further added. In the present embodiment, explanations are given while focusing on the above difference, and constituent elements identical to those of the first embodiment are denoted by like reference numerals and the explanations thereof will be omitted.

Specifically, in the present embodiment, the leaching step 601, the crystallization step 602, the chlorination step 603, the drying step 604, and an electrolysis step 607 are respectively the same as the leaching step 501, the crystallization step 502, the chlorination step 503, the drying step 504, and the electrolysis step 506 according to the fifth embodiment.

At the first purification step 605, the crude zinc chloride 3" containing impurities, obtained at the drying step 604, is brought into contact with the chlorine gas 8, thereby oxidizing metal components being impurities other than zinc contained in the crude zinc chloride 3" and turning the metal components into metal chloride having a lower boiling point than that of zinc chloride, and then the metal chloride is gasified and distilled. That is, at the first purification step 605, although the crude zinc chloride 3" being anhydrous salt is used, the first purification step 605 is the same as the first purification step 201 according to the second embodiment, and as the first purification step 403 according to the fourth embodiment.

Furthermore, at the second purification step 606, the zinc chloride component is gasified and distilled from the crude zinc chloride 3' having undergone the first purification step 605, thereby obtaining the purified zinc chloride 6. That is, the second purification step 606 is the same as the second purification step according to the second embodiment, and as the second purification step 404 according to the fourth embodiment.

According to the method of the present embodiment described above, the zinc production method includes the leaching step 601 of bringing the electric arc furnace dust 1 containing zinc oxide or the secondary dust 1 generated at the time of reducing the electric arc furnace dust 1 in the reduction furnace into contact with the aqueous solution 16 of an alkaline agent to turn the zinc oxide component in the electric arc furnace dust 1 or in the secondary dust 1 into zinc hydroxide, thereby obtaining the leaching solution 14 containing the zinc hydroxide, and the crystallization step 602 of turning the leaching solution 14 obtained at the leaching step 601 into a saturated solution of zinc hydroxide and precipitating and settling the zinc hydroxide 15 from the saturated solution, thereby separating and recovering the zinc hydroxide 15 therefrom as a solid. The zinc production method also includes the first purification step 605 of bringing the crude zinc chloride 3″ having undergone the drying step 604 into contact with the chlorine gas 8 in a molten state to oxidize the metal components other than zinc in the crude zinc chloride 3″, and heating the crude zinc chloride 3″ after turning the metal components into the metal chloride 5 having a lower boiling point than zinc chloride, thereby evaporating and separating the metal chloride 5 therefrom, the second purification step 606 of heating the crude zinc chloride 3' having undergone the first purification step 605 to produce zinc chloride vapor, and cooling and condensing the zinc chloride vapor to obtain the purified zinc chloride 6, and the electrolysis step 607 of electrolyzing the purified zinc chloride 6 obtained at the second purification step 606 in a molten state, thereby obtaining the zinc melt 9 and the chlorine gas 8. Consequently, a zinc production method that is suitable for treatment of the electric arc furnace dust or the like containing a large amount of chlorine without requiring any additional cost for dechlorination, can produce zinc bare metal having a high purity of 4N or higher, and enables operations with a compact device can be realized.

In the present invention, the shapes, arrangements, and numbers of constituent elements are not limited to those described in the above embodiments, and it is needless to mention that changes can be appropriately made without departing from the scope of the invention, such as replacing these constituent elements with other elements having equivalent operational effects.

INDUSTRIAL APPLICABILITY

As described above, according to the present invention, a zinc production method that is suitable for treatment of electric arc furnace dust or the like containing a large amount of chlorine without requiring any additional cost for dechlorination, can produce zinc bare metal having a high purity of 4N or higher, and enables operations with a compact device can be provided. Therefore, because of its general purposes and universal characteristics, applications of the present invention can be expected in a wide range in a zinc production method that uses, as an iron-making raw material, electric arc furnace dust generated at the time of dissolution smelting of scraps, or secondary dust generated in a reduction furnace at the time of recycling a part of the electric arc furnace dust, in the electric arc furnace method being one of iron-making process.

The invention claimed is:

1. A zinc production method comprising:
   a reaction step of obtaining crude zinc chloride from a zinc oxide component in electric arc furnace dust containing zinc oxide or in secondary dust generated at a time of reducing the electric arc furnace dust in a reduction furnace;
   a purification step of heating the crude zinc chloride obtained at the reaction step to produce zinc chloride vapor, and cooling and condensing the zinc chloride vapor, thereby obtaining purified zinc chloride; and
   an electrolysis step of electrolyzing the purified zinc chloride obtained at the purification step in a molten state to obtain a zinc melt and a chlorine gas,
   wherein the reaction step includes a leaching step of bringing the electric arc furnace dust or the secondary dust into contact with a chlorine gas to extract a zinc oxide component in the electric arc furnace dust or in the secondary dust as crude zinc chloride by blowing the chlorine gas into the molten zinc chloride bath in which the electric arc furnace dust or secondary dust is dispersed and immersed,
   wherein, in the reaction step, metal components are contained in the electric arc furnace dust or the secondary dust, a part of the metal components, excluding a zinc component in the electric arc furnace dust or in the secondary dust, is extracted together with the zinc component and mixed in the crude zinc chloride as a metal chloride component, and a remainder of the metal components is separated as a residue,
   and wherein, in the purification step, the metal chloride component has a lower boiling point than that of zinc chloride and gasifies earlier than the zinc chloride to separate from the zinc chloride vapor, and a remaining metal chloride component having a higher boiling point than that of the zinc chloride remains as liquid after the zinc chloride has gasified to be separated from the zinc chloride vapor.

2. The zinc production method according to claim 1, wherein at the leaching step, the electric arc furnace dust or the secondary dust is brought into contact with the chlorine gas obtained by electrolysis at the electrolysis step.

3. The zinc production method according to claim 1, wherein the purification step includes
   a first purification step of bringing the crude zinc chloride extracted at the leaching step into contact with a chlorine gas in a molten state to oxidize a metal component other than zinc in the crude zinc chloride, thereby turning the metal component into metal chloride having a lower boiling point than that of zinc chloride, and then heating the crude zinc chloride to evaporate and separate the metal chloride therefrom, and
   a second purification step of heating the crude zinc chloride having undergone the first purification step to produce zinc chloride vapor, and cooling and condensing the zinc chloride vapor to obtain purified zinc chloride, and
   at the electrolysis step, the purified zinc chloride obtained at the second purification step is used.

4. The zinc production method according to claim 3, wherein at the first purification step, the crude zinc chloride in a molten state is brought into contact with the chlorine gas obtained by electrolysis at the electrolysis step.

5. The zinc production method according to claim 3, wherein at the first purification step, the crude zinc chloride is maintained in a temperature range from 50° C. to 450° C. inclusive, in a state in which a pressure of a gas phase adjacent thereto is maintained within a range of a gauge pressure of 200 pascals or lower.

6. The zinc production method according to claim 1, wherein the crude zinc chloride is produced by heating and melting the crude zinc chloride, and by maintaining a pressure of a gas phase adjacent to a melt phase at 200 pascals or lower in a state in which a temperature of the melt phase is maintained within a range from 250° C. to 750° C. inclusive.

7. The zinc production method according to claim 1, wherein, in the reaction step, the metal components comprise Fe.

8. The zinc production method according to claim 1, wherein at the leaching step, the electric arc furnace dust or secondary dust in a powdery form is dispersed and immersed in the molten zinc chloride bath.

9. A zinc production method comprising:
- a reaction step of obtaining crude zinc chloride from a zinc oxide component in electric arc furnace dust containing zinc oxide or in secondary dust generated at a time of reducing the electric arc furnace dust in a reduction furnace;
- a purification step of heating the crude zinc chloride obtained at the reaction step to produce zinc chloride vapor, and cooling and condensing the zinc chloride vapor, thereby obtaining purified zinc chloride; and
- an electrolysis step of electrolyzing the purified zinc chloride obtained at the purification step in a molten state to obtain a zinc melt and a chlorine gas, wherein the reaction step includes:
- a leaching step of bringing the electric arc furnace dust or the secondary dust into contact with an aqueous solution of an alkaline agent to turn a zinc oxide component in the electric arc furnace dust or in the secondary dust into zinc hydroxide, thereby obtaining a leaching solution containing the zinc hydroxide,
- a crystallization step of precipitating and settling the zinc hydroxide from the leaching solution obtained at the leaching step, and separating and recovering the zinc hydroxide therefrom as a solid, and
- a chlorination step of bringing the zinc hydroxide separated and recovered at the crystallization step into contact with hydrochloric acid to obtain crude zinc chloride, and further includes a drying step of bringing the crude zinc chloride obtained at the chlorination step into contact with a chlorine gas, after heating the crude zinc chloride to separate water contained in the crude zinc chloride therefrom as water vapor, and at the purification step, the crude zinc chloride having undergone the drying step is heated.

10. The zinc production method according to claim 9, wherein at the leaching step, an aqueous solution from which the zinc hydroxide has been separated and recovered at the crystallization step is used as the aqueous solution of an alkaline agent.

11. The zinc production method according to claim 9, wherein at the chlorination step, the zinc hydroxide separated and recovered at the crystallization step is brought into contact with hydrochloric acid produced by using the chlorine gas obtained by electrolysis at the electrolysis step as a raw material.

12. The zinc production method according to claim 9, wherein an alkaline agent in the aqueous solution of an alkaline agent is sodium hydroxide or potassium hydroxide.

13. The zinc production method according to claim 9, wherein at the drying step, the crude zinc chloride from which water has been separated as water vapor is brought into contact with the chlorine gas obtained by electrolysis at the electrolysis step.

14. The zinc production method according to claim 9, wherein the purification step includes:
- a first purification step of bringing the crude zinc chloride having undergone the drying step into contact with a chlorine gas in a molten state to oxidize a metal component other than zinc in the crude zinc chloride, thereby turning the metal component into metal chloride having a lower boiling point than that of zinc chloride, and then heating the crude zinc chloride to evaporate and separate the metal chloride therefrom, and
- a second purification step of heating the crude zinc chloride having undergone the first purification step to produce zinc chloride vapor, and cooling and condensing the zinc chloride vapor to obtain purified zinc chloride, and
- at the electrolysis step, the purified zinc chloride obtained at the second purification step is used.

\* \* \* \* \*